(No Model.)
D. CRAMER.
PLANT SHIELD FOR CULTIVATORS.
No. 322,524. Patented July 21, 1885.
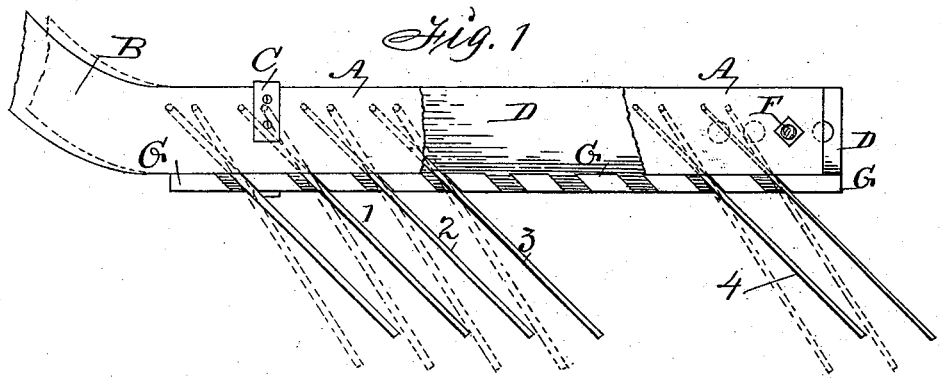
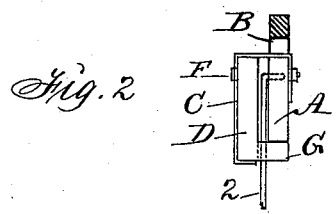
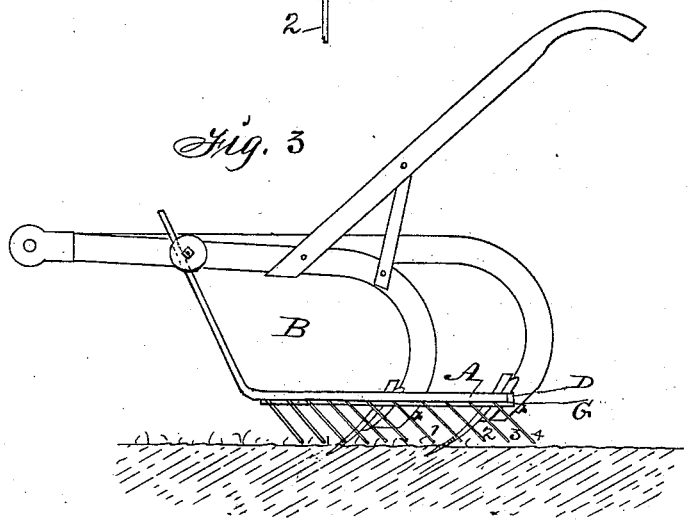
Witnesses:
M. A. Anderson.
R. H. Orwig.
Inventor:
Don Cramer,
By Thomas G. Orwig, Atty.

UNITED STATES PATENT OFFICE.

DON CRAMER, OF WALNUT, IOWA.

PLANT-SHIELD FOR CULTIVATORS.

SPECIFICATION forming part of Letters Patent No. 322,524, dated July 21, 1885.

Application filed May 15, 1885. (No model.)

*To all whom it may concern:*

Be it known that I, DON CRAMER, a citizen of the United States of America, and residing at Walnut, in the county of Pottawattamie and State of Iowa, have invented an Improved Plant-Shield for Cultivators, of which the following is a specification.

My improvement relates to plant-shields that can be readily attached to the beams of cultivators, and also readily adjusted to adapt them to be used to protect the plants when quite small, and to allow only fine ground to fall around the plants; and also adapted to be successfully used at the different stages of the growth of the plants as required to protect the plants, and at the same time allow proper quantities of loose ground to be deposited around the plants.

My invention consists in the construction and combination of a rigid bar, pivoted fenders, and a sliding bar having bearings for the pivoted fenders, as hereinafter set forth, pointed out in my claim, and illustrated in the accompanying drawings, in which—

Figure 1 is a side view of my device, having a part of the rigid bar broken away to show the fender-bearings in the sliding bar; Fig. 2, an end view, and Fig. 3 a view showing it applied as required for practical use.

A is a rigid bar that has a line of perforations. B is an inclined extension of the bar that may be integral or fixed thereto in such a manner that it will serve to connect the complete device with the beam of a cultivator.

Numbers 1 2 3 4 represent a series of fenders made of heavy wire or round iron bars, by simply cutting off pieces of uniform length, and bending their top ends at right angles to pivot them against the side of the straight bar A by simply inserting their bent ends in the perforations in the bar.

C is a loop made of strap-iron, and fixed to the bar A to inclose and support the front end of a sliding bar, D.

F is a screw-bolt passed through perforations in the rear portions of the two parallel bars to hold them together.

G is a flange at the lower edge of the sliding bar D, that overlaps the bottom of the bar A, and that has a series of notches coinciding with the series of fenders, which notches form bearings for the fenders, and hold the fenders stationary when the sliding bar is bolted fast to the bar A by means of the bolt F as required for practical use.

To adjust the fenders as required to protect small plants, I simply remove the bolt F, press the sliding bar rearward to increase the degree of inclination of the fenders and to thereby bring them closer together, place the bolt in another hole in the sliding bar, and then lower the complete device relative to the cultivator-beam. The fenders thus brought close together will allow only fine ground to pass through the shield, and consequently prevent any pieces of ground to fall upon the plants. When the corn is larger, I move the sliding bar forward and elevate the complete device relative to the beam, to which the top end of the extension B is clamped fast in a common way.

I claim as my invention—

The improved plant-shield and cultivator attachment composed of the bar A, having an upward extension, B, the series of pivoted fenders 1 2 3 4, the sliding bar D, having a notched flange, G, the fixed loop C, and the detachable bolt F, substantially as shown and described, to operate in the manner set forth, for the purposes specified.

DON CRAMER.

Witnesses:
H. E. CRAMER,
HENRY RHOADES.